United States Patent [19]
Valentin

[11] Patent Number: 5,938,888
[45] Date of Patent: Aug. 17, 1999

[54] METHOD OF AND APPARATUS FOR WELDING MITERED MATING SURFACES OF FRAME SECTIONS

[75] Inventor: Manfred Valentin, Bad Oynhausen, Germany

[73] Assignee: Schüco International KG, Bielefeld, Germany

[21] Appl. No.: 08/955,212

[22] Filed: Oct. 21, 1997

[30] Foreign Application Priority Data

Oct. 24, 1996 [DE] Germany .......................... 196 44 183

[51] Int. Cl.$^6$ ...................................................... B32B 31/00
[52] U.S. Cl. .................. 156/499; 156/304.1; 156/304.6; 156/309.9; 156/322
[58] Field of Search ................................. 156/156, 304.1, 156/304.2, 304.5, 304.6, 308.2, 309.6, 309.9, 322, 323, 499; 425/500, 506, 508, 520

[56] References Cited

U.S. PATENT DOCUMENTS

| | | | |
|---|---|---|---|
| 4,183,778 | 1/1980 | Mesnel | 156/245 |
| 4,601,927 | 7/1986 | Durfee | 156/309.6 X |
| 4,752,350 | 6/1988 | Schuster | 156/379.6 |
| 5,240,537 | 8/1993 | Bodicky | 156/304.2 X |
| 5,370,835 | 12/1994 | Sturtz | 264/248 |
| 5,614,052 | 3/1997 | Fisher | 156/304.2 |

*Primary Examiner*—James Engel
*Attorney, Agent, or Firm*—Henry M. Feiereisen

[57] ABSTRACT

A method of welding mitered surfaces of frame sections made of plastic material and having incorporated therein a seal of weldable material extending along the frame sections and composed of an attachment foot and at least a sealing lip, for use in windows or doors, includes the steps of heat-welding mitered surfaces and adjoining frame section zones by means of a heated mirror while covering during welding operation an inner contour of the seal by at least one form-part that is positioned in and neighboring the miter plane and has a contour which substantially complements the inner contour of the seal. Subsequently, after removing the heated mirror from the miter corner and withdrawing the form-part the area of the seal, the mitered surfaces of the frame section are squeezed together.

17 Claims, 10 Drawing Sheets

METHOD OF AND APPARATUS FOR WELDING MITERED MATING SURFACES OF FRAME SECTIONS

BACKGROUND OF THE INVENTION

The present invention generally refers to a method of welding mitered mating surfaces of frame sections of plastic material, adapted for use in windows and doors and having incorporated therein seals of heat weldable material e.g. thermoplastic material, extending over the entire frame section and composed of an attachment foot and at least one sealing lip. Further, the present invention relates to an apparatus for welding such mitered surfaces of frame sections.

In conventional welding processes, the mitered surfaces of the frame sections together with adjoining frame section zones are being heat-welded by a heated flat mirror until reaching welding temperature. Subsequently, the mirror is removed from the area of the mitered surfaces and the mitered mating surfaces of the frame sections are pressed together. This process results in the formation of welding beads which are made through a thorough mixture of seal material and frame material in the region of the mitered surfaces. This mixture fully negates or at least significantly deteriorates the elastic properties of the seals in the corner area.

SUMMARY OF THE INVENTION

It is thus an object of the present invention to provide an improved method of welding mitered surfaces of plastic frame sections, obviating the afore-stated drawbacks.

In particular, it is an object of the present invention to provide an improved method of welding mitered surfaces of plastic frame sections th at does not adversely affect the elastic properties of the seal in the corner area.

These objects and others which will become apparent hereinafter are attained in accordance with the present invention by heating mitered surfaces and adjoining frame section zones to a welding temperature through use of a heated mirror while covering during welding operation an inner contour of the seal by at least one form-part that is positioned in and neighboring the miter plane and has a contour which substantially complements the inner contour of the seal, removing the heated mirror from the mitered surfaces and withdrawing the form-part from the area of the seal, after the mitered surfaces together have been pressed.

The provision of a form-part having a contour substantially complementing the inner contour of the sealing lip and attachment foot of the seal prevents the formation of a bead during welding operation of the frame sections and seals in these areas so that the elasticity of the seal in the miter corner is not adversely affected during welding, especially since a welding bead forming on the outside of the seal can easily be removed.

According to another feature of the present invention, additional form-parts may be used during welding operation that have a configuration complementing the outer contour of the seal in immediate proximity of the mitered surfaces, with a gap being formed in the miter plane for allowing escape of the welding bead. After welding of the frame sections and the seals, the form-parts and the bead forming on the outside of the seal are removed.

It is still another object of the present invention to provide an improved apparatus for welding mitered surfaces of plastic frame sections.

This object is attained in accordance with the present invention by providing at least one form-part for covering an inner contour of the seal during welding operation of the frame sections in a miter corner, with the form-part having a contour which substantially complements an inner contour of the seal and being so controlled as to be movable into the miter region for covering the inner contour of the seal during the welding operation.

Preferably, the form-part is formed as angled plunger having a laterally projecting leg exhibiting a contour which complements the inner contour of the seal and being supported during welding upon the attachment foot of the seal. The leg may be formed with recesses for receiving the sealing lip, or a part thereof, or receiving protrusions of the attachment foot.

According to another feature of the present invention, a cover element is positioned adjacent the plunger for covering also the outer contour of the sealing lip, with the cover element being provided with recesses for engagement by the sealing lip. Suitably, the cover element bears upon the plunger during welding operation.

According to still another feature of the present invention, the plungers are actuated by a driving mechanism in the form of a receptacle having a chamber accommodating a spring which loads the plunger, with the receptacle being formed with an oblique ramp surface cooperating with a profiled edge of the frame sections or an edge of a welding machine.

Alternatively, the movement of the plungers may also be attained by a guide mechanism including a guide piece shiftable in a slanted track arranged in a plane of the frame sections. Suitably, a spring compensation is provided acting parallel to the frame sections.

BRIEF DESCRIPTION OF THE DRAWING

The above and other objects, features and advantages of the present invention will now be described in more detail with reference to the accompanying drawing, in which.

DETAILED DESCRIPTION OF PREFERRED EMBODIMENTS

Figure 1:
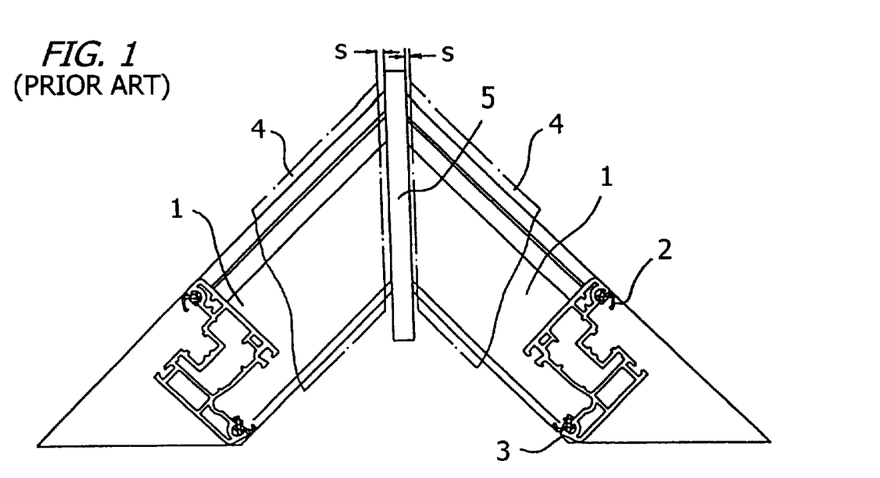
FIG. 1 is a schematic view of a corner area between two frame sections with mitered surfaces, illustrating a first step of a conventional process of joining the mitered mating surfaces of the frame sections.

Turning now to the drawing, and in particular to FIG. 1, there is shown a schematic view of a miter corner between two frame sections 1 with mitered surfaces. The frame sections 1 are designed as hollow sections of plastic material having anchoring recesses for receiving strips 2, 3 of sealing material which extend over the entire length of the frame sections 1.

In order to join the mitered mating surfaces of the frame sections 1 in the miter corner, the frame sections 1 are conventionally placed on a bench of a welding machine and held in fittings 4 of a welding apparatus (not shown) which essentially circumscribe visible areas and functional areas of the frame sections 1. These fittings 4 are designated as shims or bead confines.

In FIG. 1, the miter surfaces of the frame sections bear upon a heated flat plate or mirror 5 by which the mating surfaces in the miter corner and the adjoining zones of the frame sections are heated, with the heat transfer being effected through heat conduction. The fittings 4 which form shims or bead confines are spaced from the mitered surfaces being welded at a distance S or approximately 3 mm. This distance S forms the so-called weld supplement.

Figure 2:
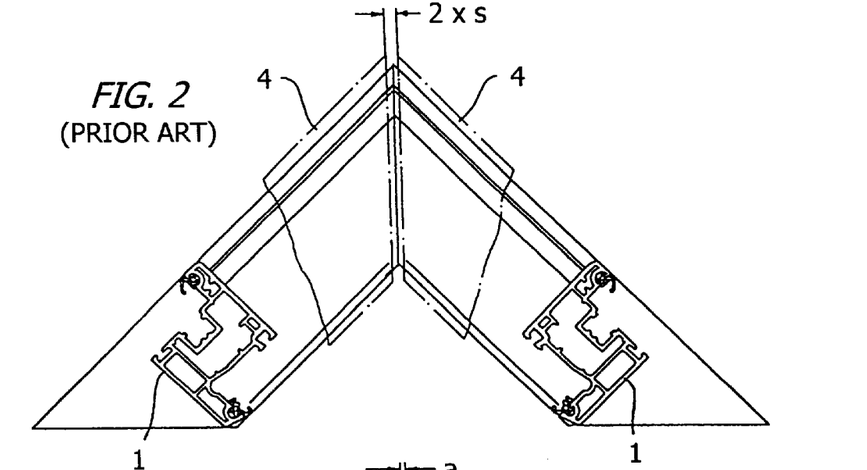
FIG. 2 is a schematic view of the two frame sections of FIG. 1, showing a second step of the conventional process of joining the mitered surfaces of the frame sections.

FIG. 2 shows a next step of the conventional welding process after heating the miter surfaces and the adjoining frame section areas by the heated mirror 5, with the heated miter surfaces joined to one another to form the miter corner, with the fittings 4 facing each other by a distance 2S.

Figure 3:
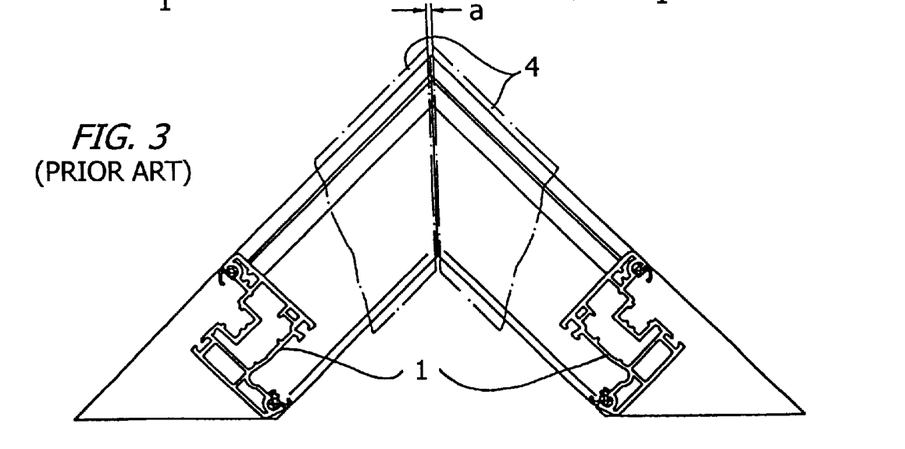
FIG. 3 is a schematic view of the two frame sections of FIG. 1, showing a third step of the conventional process of joining the mitered surfaces of the frame sections.

Subsequently, as shown in FIG. 3, the miter surfaces of the frame sections 1 are squeezed together. As a consequence of the plastic deformation of the edge material plastified during heating operation, the frame sections 1 are joined in this area to such an extent that the remaining gap a between the fittings 4 amounts to only 0.2 to 0.3 mm.

Figure 4:
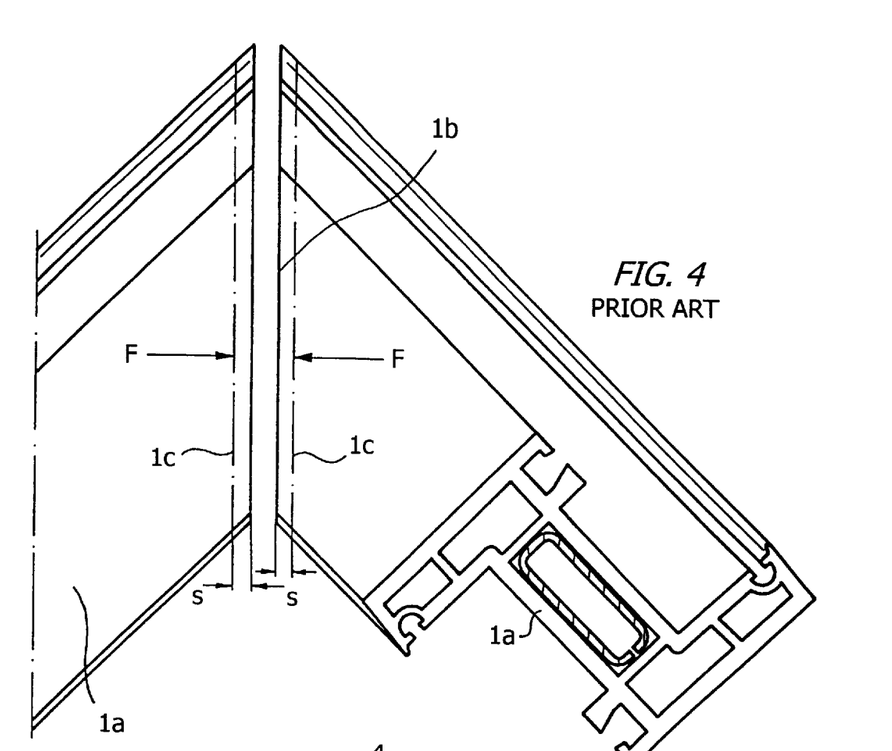
FIG. 4 is a schematic view of a corner area between two frame sections with mitered surfaces, illustrating another conventional process of joining the mitered surfaces of the frame sections.

FIG. 4 is a schematic view of a miter corner between two frame sections 1a with mitered surfaces 1b, illustrating another conventional process of joining the mitered surfaces 1b of the frame sections 1a. Adjacent the miter surfaces 1b is the plastifiable weld supplement which is subsequently displaced by welding forces F acting in direction of the illustrated arrows during joining until effecting an overlap of lines 1c. Material of the plastified weld supplement S being displaced during welding operation zone escapes partially into voids of the frame sections 1a (or 1) and partially to the outside across the outside surface areas of the frame sections 1a.

Without the fittings 4, significant deformations of the configuration of the frame sections 1a in the corner area, i.e. in the weld zone, would be experienced. Although not shown in detail, the fittings 4 are formed in close proximity to the weld zone with collection spaces to allow displaced material during welding to escape thereto.

Figure 5:
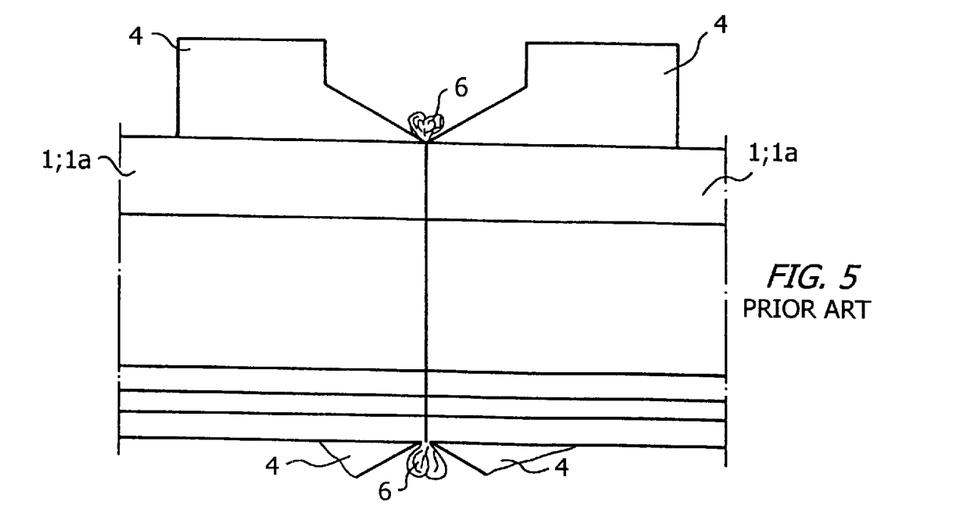
FIG. 5 is a schematic fragmentary view of two frame sections, as viewed in direction of the miter joint, illustrating still another process of joining the mitered surfaces of the frame sections.
Figure 5A:
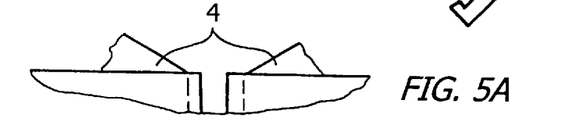
FIG. 5a is a schematic cutaway view of fittings as used in the process of FIG. 5.

FIG. 5 shows two frame sections 1 (or 1a) welded along their miter mating surfaces and viewed in direction along the miter joint. The fittings 4 are so configured as to be directed toward the welding seam or miter zone in a wedge-like fashion and to approximately terminate in a pointed end. The pointed ends of the fittings 4 are spaced from one another by a distance of 0.2 to 0.3 mm so that plastified material escaping toward the outside creates beads 6 of an approximately heart-shaped configuration in the space above the converging pointed ends of the fittings 4. When forming a frame of a door or a window by connecting the frame sections 1 or 1a, these beads 6, which represent a significant volume, are connected by a thin web to the frame and can be severed mechanically in a clean and easy manner. Finishing of a welded miter corner may also be executed by special machines or implements in a fully automatic manner.

The formation of such beads occur also in areas of the accommodated seals 2, 3 and mix with the plastified and displaced material of the frame sections 1, 1a. A mixture of hard and soft materials results in a block-type, essentially non-elastic component in the region of the seals joined in the corner area thereof.

Figure 6:
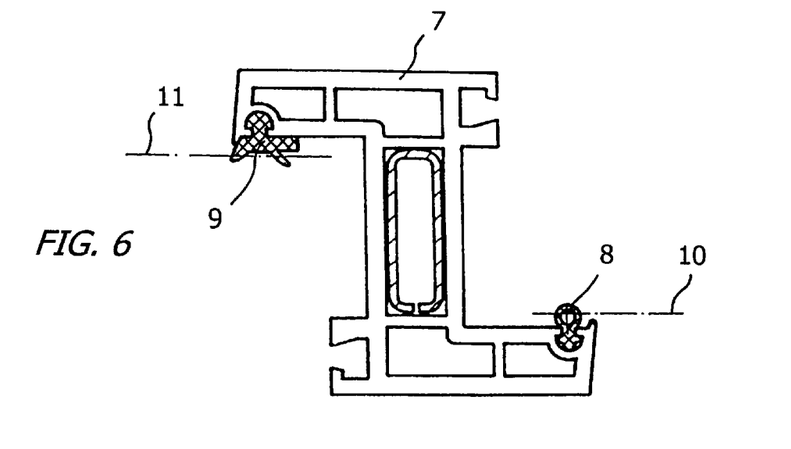
FIG. 6 is a schematic illustration of a typical frame section formed with a stop seal and a glass-supporting seal.
Figure 7:
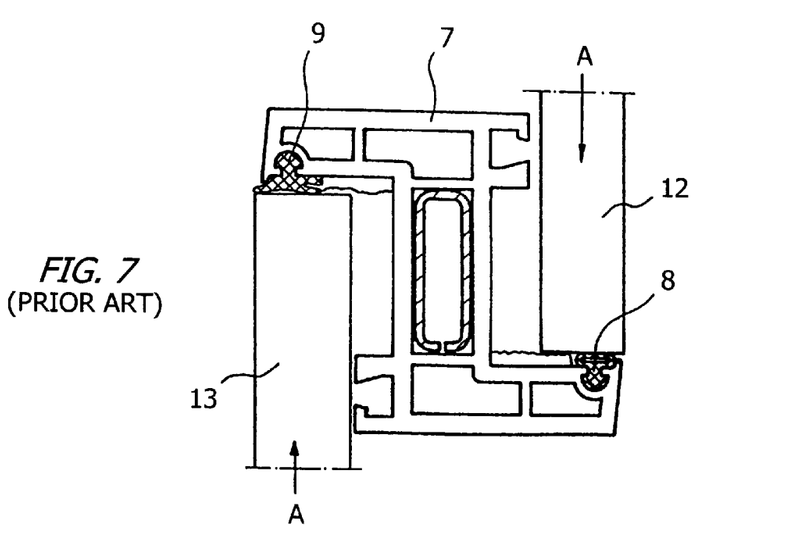
FIG. 7 is a schematic illustration of the frame section of FIG. 6, illustrating yet another conventional process during welding of the frame section.
Figure 7A:
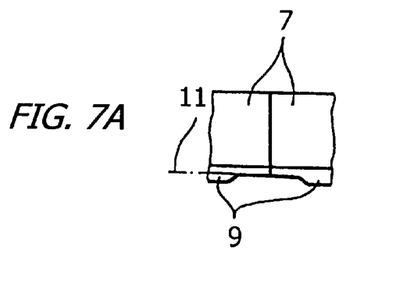
FIG. 7a is a cutaway view of the frame section of FIG. 6 illustrating an area of the stop seal after welding operation.
Figure 7B:
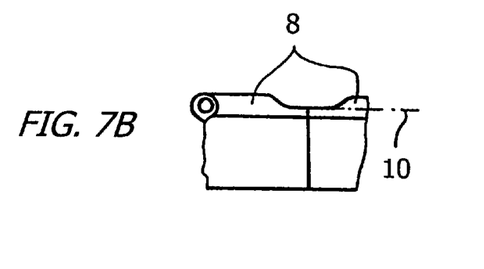
FIG. 7b is a cutaway view of the frame section of FIG. 6 illustrating an area of the glass-supporting seal after welding operation.

FIG. 6 illustrates a typical frame section 7 which has incorporated therein a stop seal 8 and a glass-supporting seal 9. Line 10 denotes the contact surface of the frame section 7 with which the frame section 7 interacts in the entire window while line 11 denotes the area of the window pane upon which the seal 9 elastically deforms. Although not shown in detail, the fittings forming the shims or bead confines are so configured in immediate proximity of the corner area of the seals 8, 9 that plungers 12, 13 are able to so compress the seals 8, 9 during welding operation as to be in alignment with the lines 10, 11, as indicated in FIG. 7. After hardening of the welded corner, a hard, non-elastic material formation is created in the miter corner. FIG. 7a shows the non-elastic area in vicinity of the seal 9 in the form of a vertical line at both sides of the miter plane, and FIG. 7b shows the non-elastic area in vicinity of the seal 8 in the form of a vertical line at both sides of the miter plane. Outside the non-elastic corner region, the seals 8, 9 exhibit full elasticity and resiliency as demanded from seals.

In conjunction with a tightness of windows, in particular in the area of active seals such as between window frame and casement, the sealed corners are of particular relevance. The accurate configuration of the seal in the miter corner and in particular the required elasticity over the entire effective area of the seal is needed for an unobjectionable tightness of such elements.

The casement and window frame of a widow or a door are joined together by fittings which are received e.g. in grooves of the frame sections or in specially made recesses in the sections. This results in tolerances so that the actual support plane, e.g. of the seal 8, may fluctuate about the theoretical contact area 10 according to FIG. 6. The creation of a non-elastic and preformed seal in the miter corner of the seals is unable to follow these tolerances and thus leads to untight regions in the corner and to deformations and compression of the frame sections and the fittings.

Figure 8:
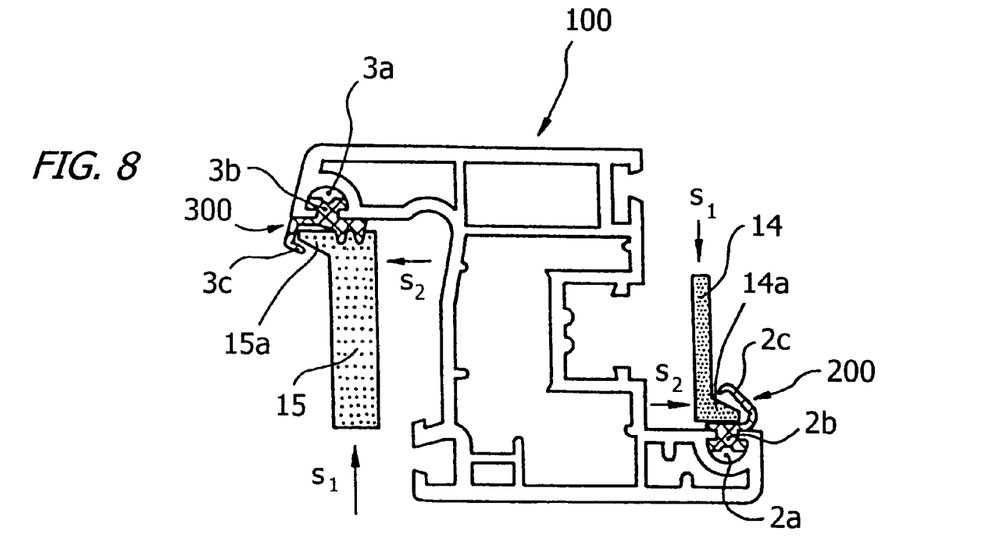
FIG. 8 is a schematic illustration of a frame section, illustrating in detail the provision of form-parts for use during welding operation in accordance with a method of the present invention.

Turning now to FIG. 8, there is shown a schematic illustration of a frame section, generally designated by reference numeral 100, illustrating in detail the provision of form-parts or plungers for use during welding operation in accordance with a method of the present invention. The frame section 100 is formed with anchoring recesses 2a, 3a for receiving strips of sealing material, generally designated by reference numerals 200, 300. Each of the seals 200, 300 is formed by an attachment foot 2b, 3b and a sealing lip 2c, 3c which together define the inner contour of the seals 200, 300. As shown in FIG. 8, the inner contour of the seal 200 is covered by a form-part in the form of a plunger 14, and the inner contour of the seal 300 is covered by a form-part in the form of a plunger 15. Each of the plungers 14, 15 is of substantially angled or L-shaped configuration so as to exhibit a laterally projecting leg 14a, 15a, with leg 14a complementing the inner contour of seal 200 and being supported by the attachment foot 2b during welding, and with leg 15a complementing the inner contour of seal 300 and being supported by the attachment foot 3b during welding. In the embodiment of FIG. 8, the legs 14a, 15a do not fully match the inner contour of the seals 200, 300 and do not cover them in a fully form-fitting manner so that a welding bead of small dimensions may form in the area of the miter corner of the seals. This bead, however, does not significantly affect the elasticity of the seal in the miter area.

Figure 9:
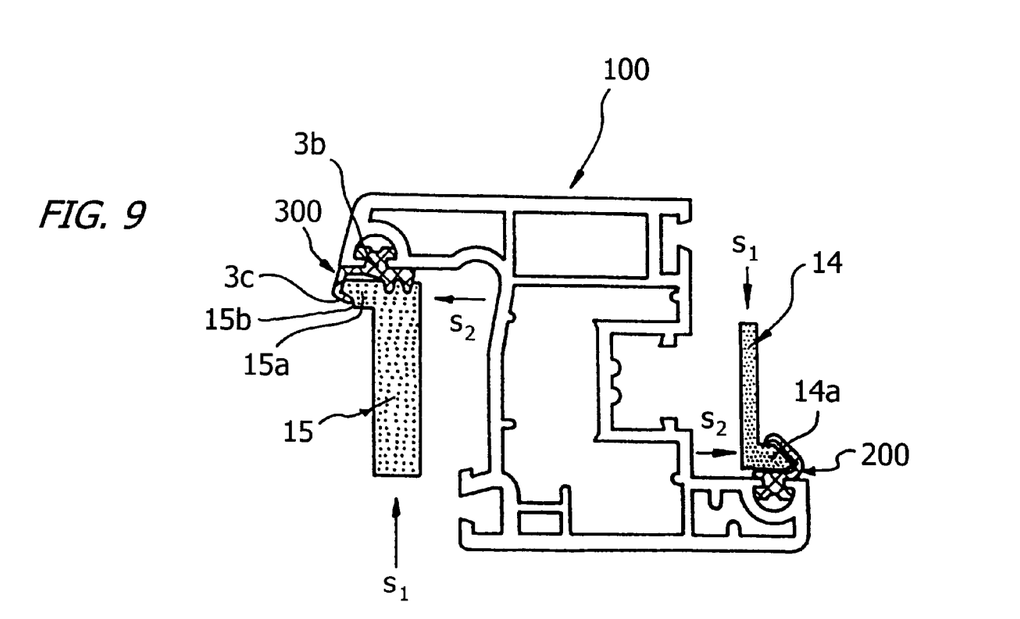
FIG. 9 is a schematic illustration of the frame section of FIG. 8, illustrating in detail modified form-parts for use during welding operation in accordance with the present invention.

In the embodiment of FIG. 9, the legs 14a, 15a of the plungers 14, 15 are so configured as to be in snug-fit with the inner contour of the seals 200, 300, with leg 15a being formed with a recess 15b for receiving the sealing lip 3c and with grooves for receiving protrusions of the attachment foot 3b. Upon covering the inner contour of the seals 200, 300, as shown in FIG. 9, a bead of sealing material may be formed only on the outer surface of the seal in the miter corner. This bead can be cleanly and easily be removed. As the miter area of the seal is free from beads, the elasticity of the seals and its functionality are not adversely affected in the corner area.

The plungers 14, 15 can each be shifted in direction of arrows $S_1$, $S_2$ to conform to the inner contour of the seals 200, 300. It is also conceivable to swing the plungers 14, 15 with their legs 14a, 15a into the space bounded by the inner contour of the seals.

The plungers 14, 15 for covering the inner contour of the seals abutting in the miter corner may be of single-piece configuration or of multi-part configuration.

Figure 10:
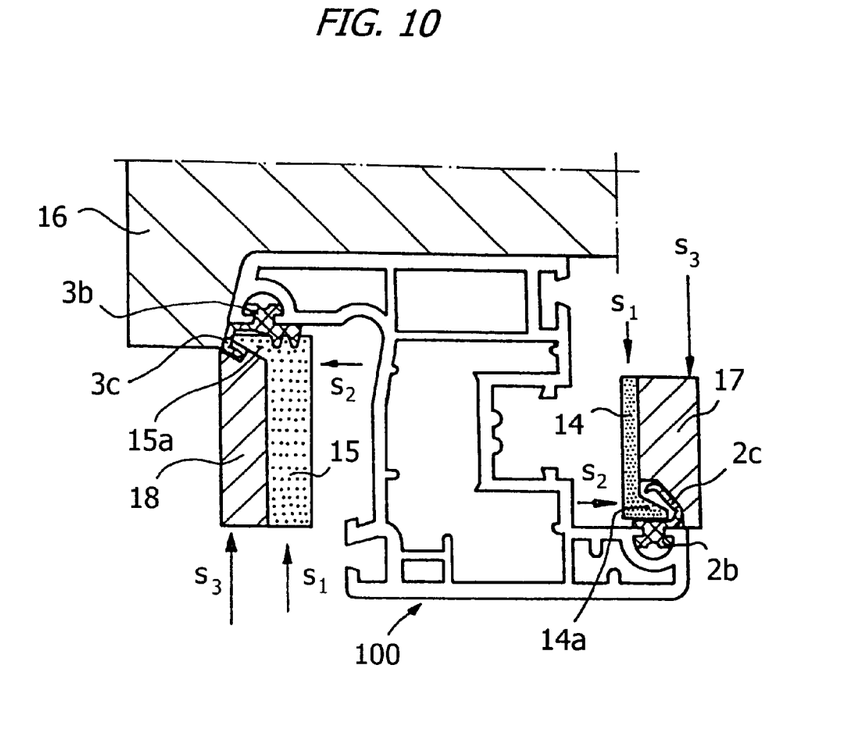
FIG. 10 is a schematic illustration of the frame section of FIG. 8 received in fittings and illustrating covering members for use in addition to the form-parts in a welding process according to the present invention.

FIG. 10 shows a modification of the embodiment of FIG. 8, with the difference residing in the additional provision of a fitting 16 provided at the outside or visible surface of the frame section 100 and serving as shim or bead confine. The legs 14a, 15a of the plungers 14, 15 demarcate solely the attachment foot 2b, 3b and allow the formation of a welding bead at slight dimensions inside the sealing lip 2c, 3c. In addition, covering elements 17, 18 are provided having suitable recesses for masking the outer contour of the sealing lips 2c, 3c and bear upon the plungers 14, 15. Through the provision of the covering elements 17, 18, the quality of the miter corner after welding operation is enhanced as far as their elastic properties are concerned.

Figure 11:
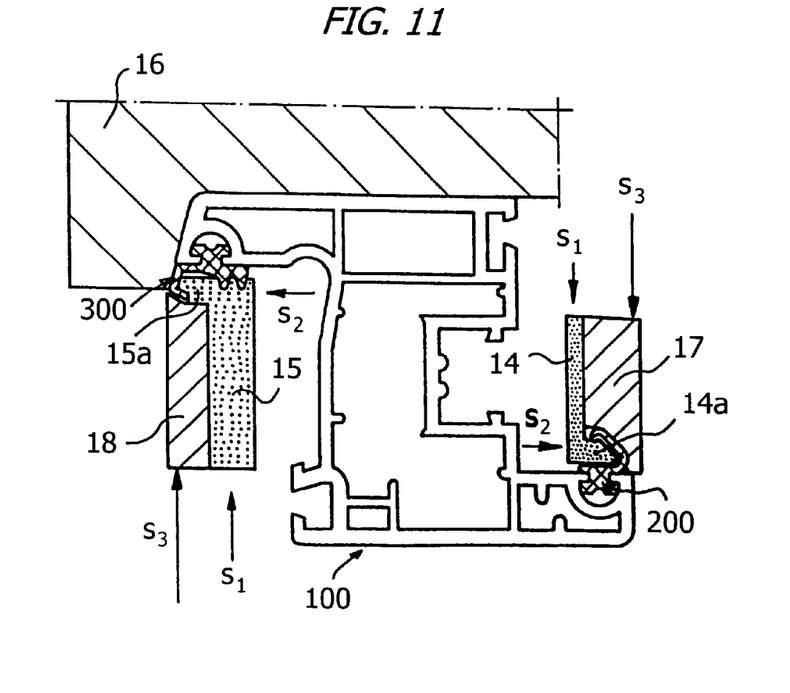
FIG. 11 is a schematic illustration of the frame section of FIG. 8, illustrating in detail modified form-parts for use during welding operation and modified covering members for use in a welding process in accordance with the present invention.

FIG. 11 shows an embodiment in which the legs 14a, 15a of the plungers 14, 15 are closely suited to the inner contour of the seals 200, 300 and thus are formed with recesses for receiving parts of the sealing lips 2c, 3c and protrusions of the attachment foot 2b, 3b so that the formation of a bead of sealing material inside the seals in the miter zone is prevented.

Figure 12:
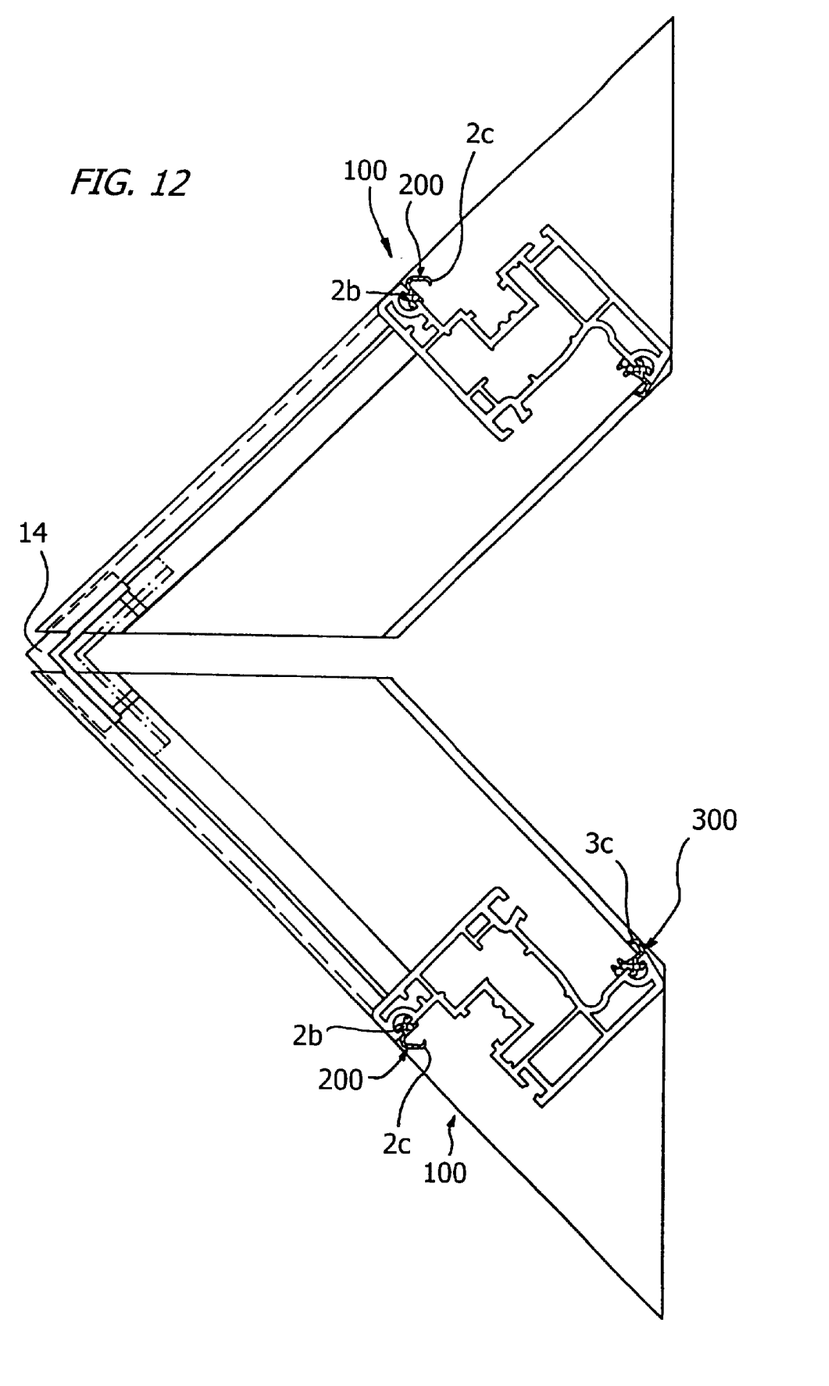
FIG. 12 is a schematic view of a corner area between two frame sections, showing an intermediate step of joining mitered surfaces of the frame sections by way of a process in accordance with the present invention, illustrating in detail the disposition of the form-part.

In accordance with the embodiments shown in FIGS. 11 and 12, the covering elements 17, 18 for the outer contour of the sealing lips 2c, 3c are supported during the welding operation by the laterally projecting legs 14a, 15a of the plungers 14, 15 or by the frame section 100. Suitably, the leg 14a, 15a of the plungers 14, 15 may be designed as angles suited to the miter corner. Arrows $S_1$, $S_2$ and $S_3$ indicate directions of movement of the plungers 14, 15 and the covering elements 17, 18 during mounting.

Figure 13:
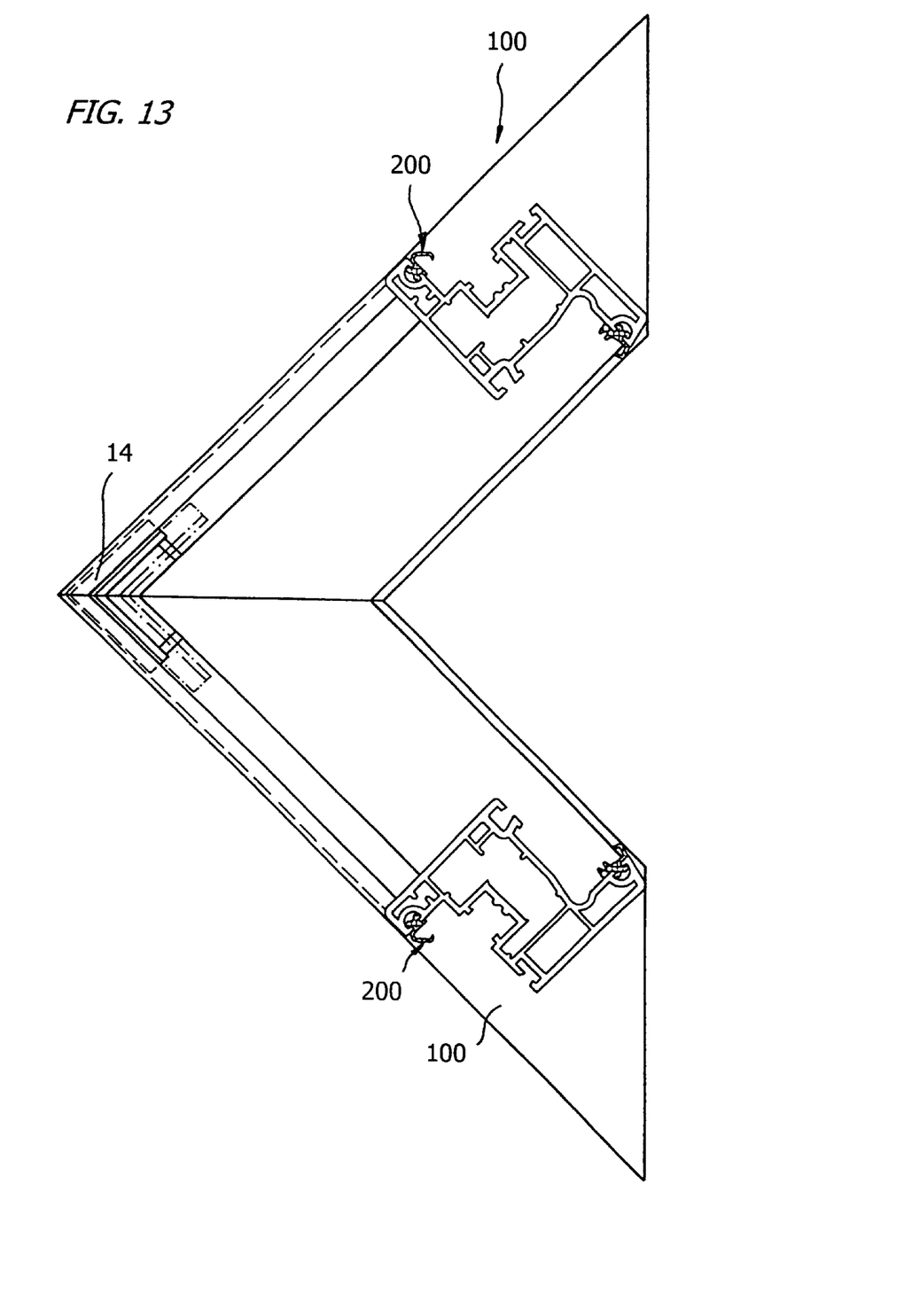
FIG. 13 is a schematic view of the two frame sections of FIG. 12, showing a final step of joining mitered mating surfaces of the frame sections by way of a process in accordance with the present invention.

FIG. 12 shows a miter corner after plastification and removal of the heated mirror, and it can be seen that the frame sections 100 are positioned at a distance in correspondence to the width of the mirror. In this stage, the plunger 14 is placed on the attachment foot 2b, moved underneath the sealing lip 2c and secured in place. The angled plunger 14 is supported by areas of covering elements 17 and is directed with its legs by the covering elements 17 into the end position of the welded corner, as shown in FIG. 13. After conclusion of the welding operation, the angled plunger 14 is shifted from the corner into the position shown in dash-dot line and can then be removed upwardly from the area of the corner.

Figure 14:
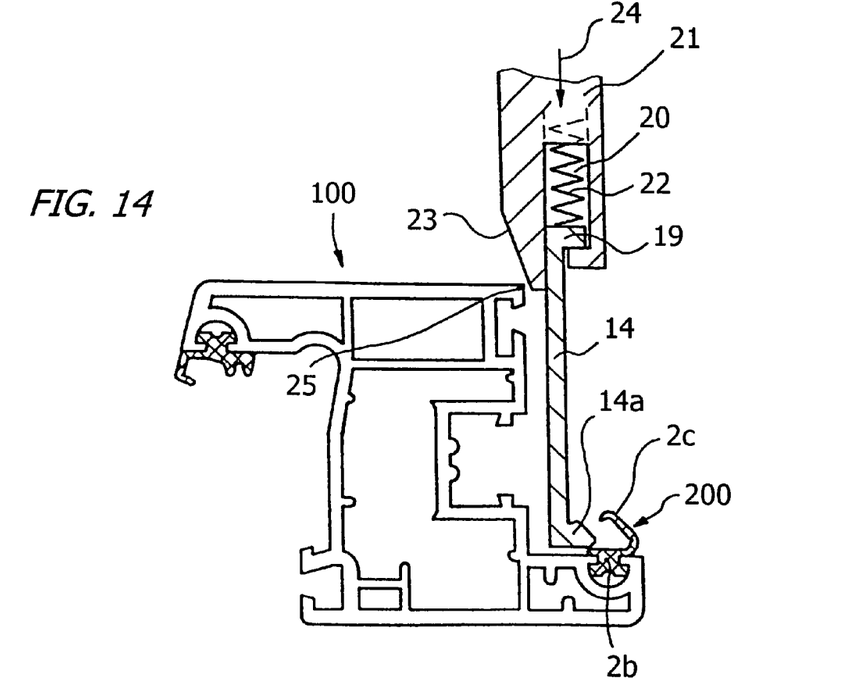
FIG. 14 is a schematic view of the two frame sections of FIG. 12, showing in detail an actuating mechanism for moving the form-part toward the seal arrangement.
Figure 15:
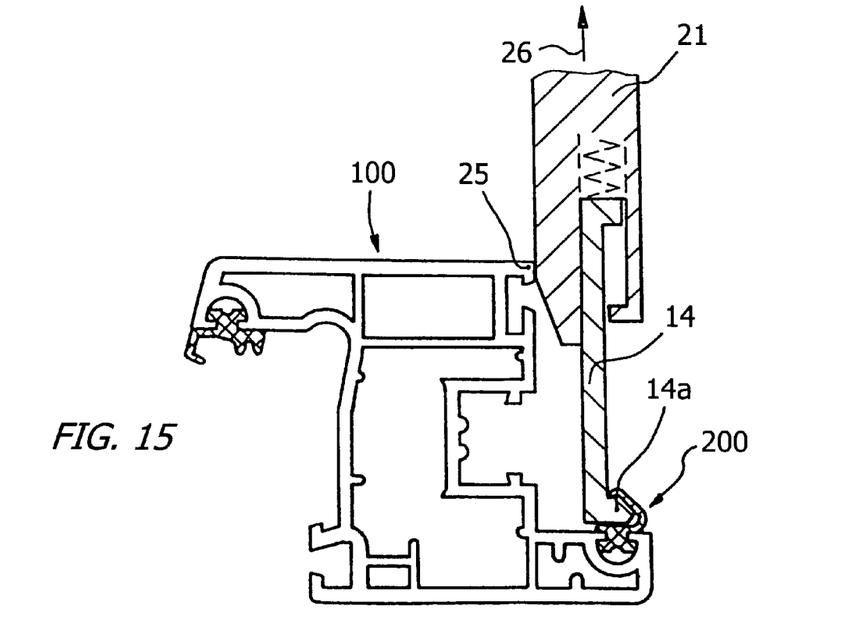
FIG. 15 is a schematic view of the two frame sections of FIG. 14, showing the form-part in close contact with the seal.

FIGS. 14 and 15 illustrate a nonlimiting example for controlling the movement of the angled plunger 14 and its leg 14a with respect to the inner contour of the seal 200. In FIG. 14, the plunger 14 is moved to an idle position outside the sealing lip 2c toward the frame section 100 and supported by the attachment foot 2b. The plunger 14 is received with its leg-distal end 19 in a chamber 20 of a receptacle 21. Extending within the chamber 20 is a spring 22 which biases the plunger end 19 in direction toward the attachment foot 2b. The receptacle 21 is formed with an slanted ramp 23 which is so configured and so cooperates with a profiled edge 25 of the frame section 100 that during movement of the receptacle 21 in direction of arrow 24, the receptacle 21 and the plunger 14 are moved away from the frame section 100, with the leg 14a of the plunger 14 entering the space between the sealing lip 2c and the attachment foot 2b to match the inner contour of the seal 200. This end position is shown in FIG. 15. A reversal of the direction of movement of the receptacle 21 in direction of arrow 21 forces the plunger 14 out of engagement with the seal 200 into the position shown in FIG. 14.

Figure 16:
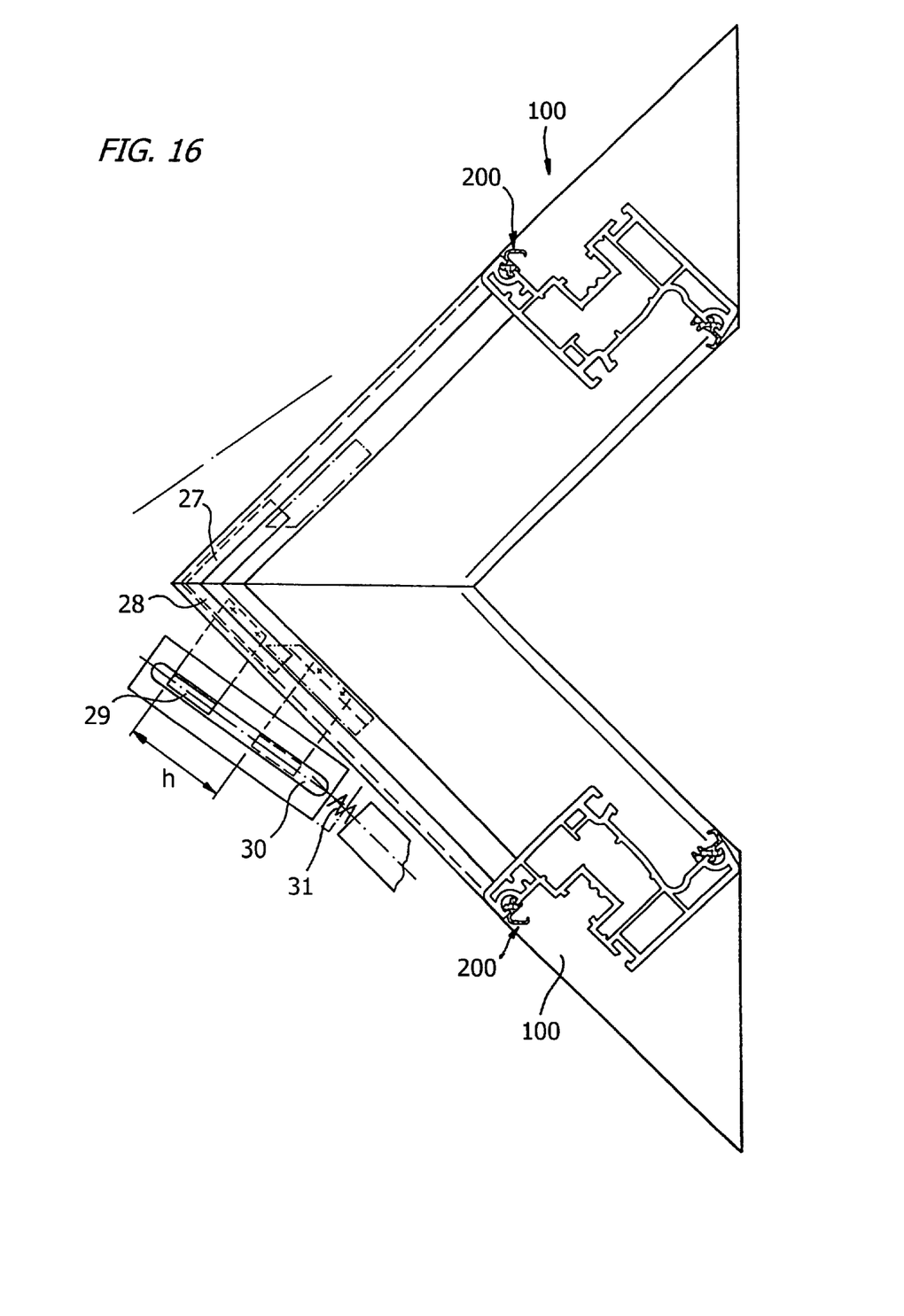
FIG. 16 is a schematic view of a corner area between two frame sections joined together by a process in accordance with the present invention, utilizing a modified form-part.

FIG. 16 shows a modified configuration of a plunger for covering the inner contour of the seal 200. The plunger of FIG. 16 is composed of components 27, 28 which are flush jointed in the miter corner. Plunger components 27, 28 are connected to a displaceable guide piece 29 which executes a stroke h in a slanted track 30. Thus, the plunger components 27, 28 can be shifted to their respective effective positions by the drive for the guide piece 29, whereby the drive may be of pneumatic or hydraulic nature. Provided parallel to the frame sections 100 is a spring compensation 31 in order to compensate movements during the welding operation and work off of the weld supplement.

During heating, the plunger components 27, 28 occupy the retracted position, as shown in FIG. 16 by dash-dot line. In this retracted position, the plunger components 27, 28 are not subject to the heating action by the heated mirror. After pivoting the mirror out of the weld zone, the plunger components 27, 28 are moved by the guide pieces 29 in direction under the sealing lip of the seal 200 in the corner area.

Figure 17:
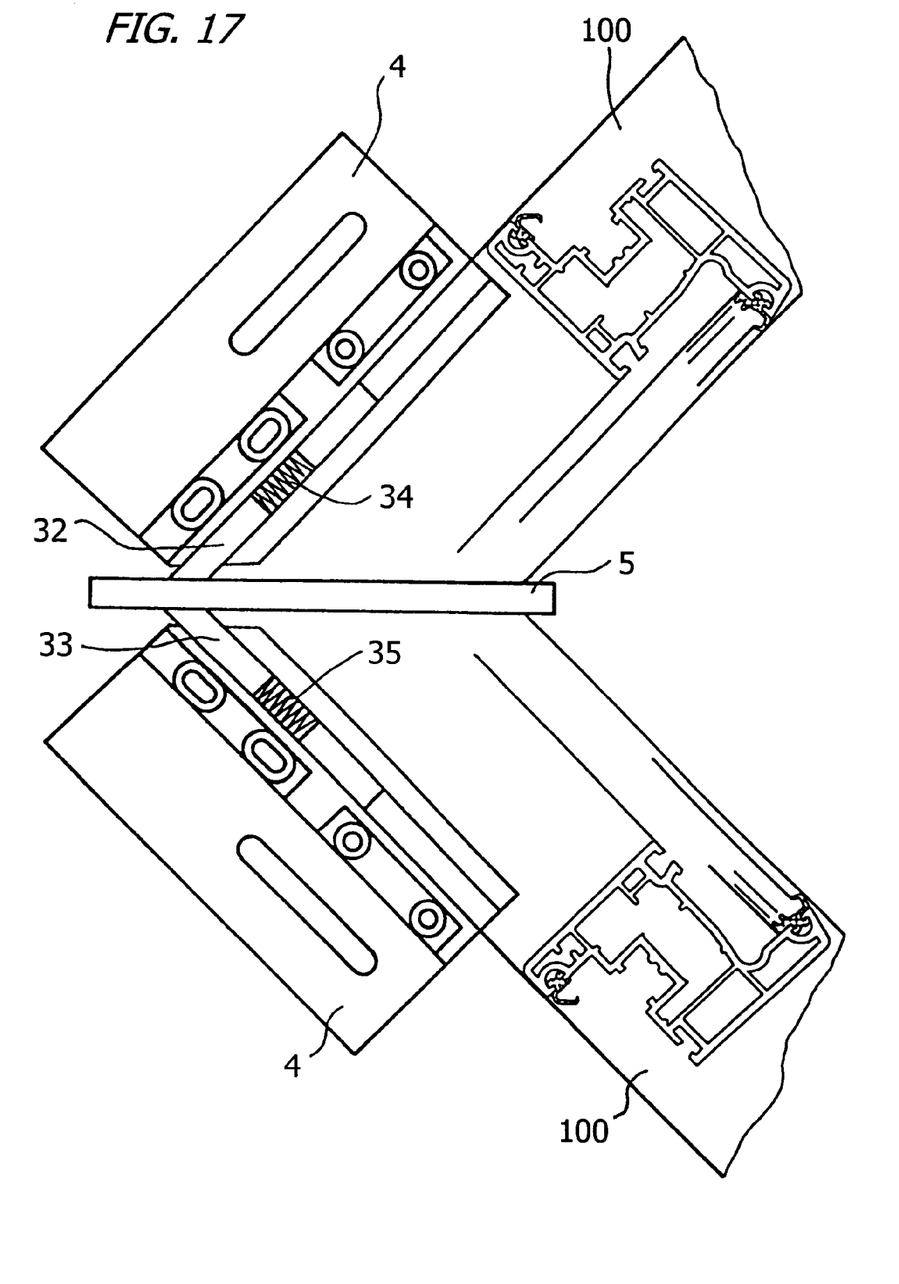
FIG. 17 is a schematic view of a corner area between two frame sections joined together by a process in accordance with the present invention, utilizing still another type of form-parts.

FIG. 17 shows another embodiment of a plunger configuration in the form of plungers 32, 33 being supported in the fittings 4 which form the bead confines or shim. The plungers 32, 33 are biased by springs 34, 35 in direction of the miter corner. FIG. 17 shows the stage during heat-welding operation by means of the heated mirror 5, with the plungers 32, 33 bearing with their miter corner facing ends upon the heated mirror. After removing the mirror 5 and joining of the plastified frame sections 100 to effect the actual welding, the plungers 32, 33 abut one another with their miter corner facing ends to effect a close contact with and covering of the inner contour of the seals in the area of the miter.

While the invention has been illustrated and described as embodied in a method of and apparatus for welding mitered mating surfaces of frame sections, it is not intended to be limited to the details shown since various modifications and structural changes may be made without departing in any way from the spirit of the present invention.

What is claimed as new and desired to be protected by letters patent is set forth in the appended claims:

What is claimed is:

1. Apparatus for welding mitered surfaces of frame sections made of plastic material and having incorporated therein a seal of weldable material which extends along the frame sections and includes an attachment foot and at least a sealing lip, for use in windows or doors; comprising:
    a heated mirror for heat-welding the mitered surfaces and adjoining frame section zones;
    at least one form-part formed as an angled plunger for covering an inner contour of the seal during welding operation of the frame sections in a miter corner, said plunger having a laterally projecting leg having a contour which substantially complements an inner contour of the seal and being so controlled as to be movable into the miter corner for covering the inner contour of the seal during the welding operation; and
    a receptacle having a chamber accommodating a spring, said plunger having a leg-distal end extending into the chamber and loaded by the spring, said receptacle being formed with a slanted ramp surface cooperating with an element selected from the group consisting of a profiled edge of the frame sections and an edge of a welding machine.

2. The apparatus of claim 1 wherein a plurality of such form-parts are provided for covering the inner contour of respective number of seals, said form-parts being secured to one another in a force-locking manner.

3. The apparatus of claim 1 wherein the leg is formed with recesses for receiving the sealing lip or a part thereof.

4. The apparatus of claim 1 wherein the leg is formed with recesses for receiving protrusions of the attachment foot.

5. The apparatus of claim 1, and further comprising a cover element adjacent the plunger for covering an outer contour of the sealing lip, said cover element being provided with recesses for engagement by the sealing lip.

6. The apparatus of claim 5 wherein the cover element bears upon the plunger during welding operation.

7. The apparatus of claim 6 wherein the cover element bears upon an element selected from the group consisting of the laterally projecting leg of the plunger, and one of the frame sections.

8. The apparatus of claim 1 wherein the leg of the plunger is configured in the form of an angle suited to the miter corner.

9. Apparatus for welding mitered surfaces of frame sections made of plastic material and having incorporated therein a seal of weldable material which extends along the frame sections and includes an attachment foot and at least a sealing lip, for use in windows or doors; comprising:
    a heated mirror for heat-welding the mitered surfaces and adjoining frame section zones; and
    two form-parts are provided for covering an inner contour of a respective number of seals during the welding operation of a miter corner of the frame sections, said form-parts having a contour which substantially complements an inner contour of the seals, and are formed as two plungers butt-jointed in the miter zone during the welding operation and so controlled as to be movable into the miter corner for covering the inner contour of the seal during the welding operation.

10. The apparatus of claim 9, further comprising a cover element adjacent the plunger for covering an outer contour of the sealing lip, said cover element being provided with recesses for engagement by the sealing lip.

11. Apparatus for welding mitered surfaces of frame sections made of plastic material and having incorporated therein a seal of weldable material which extends along the frame sections and includes an attachment foot and at least a sealing lip, for use in windows or doors; comprising:
    a heated mirror for heat-welding the mitered surfaces and adjoining frame section zones;
    a plurality of form-parts for covering an inner contour of a respective number of seals during welding operation of the frame sections in a miter corner, each form-part being secured to one another in a force locking manner, each form-part having a contour which substantially complements an inner contour of the seal and being so controlled as to be movable into the miter corner for covering the inner contour of the seal during the welding operation; and
    fittings for circumscribing areas of the frame sections and providing confines for formation of a welding bead, said form-parts being configured as plungers which are so slidably received in the fittings as to follow the movement of the frame sections toward one another and to move underneath the sealing lip.

12. The apparatus of claim 11, wherein the leg of the plunger is configured in the form of an angle suited to the miter corner.

13. Apparatus for welding mitered surfaces of frame sections made of plastic material and having incorporated therein a seal of weldable material which extends along the frame sections and includes an attachment foot and at least a sealing lip, for use in windows or doors; comprising:

a heated mirror for heat-welding the mitered surfaces and adjoining frame section zones;

two form-parts for covering the inner contour of a respective number of seals during welding operation of the frame sections in a miter corner, said form-parts being formed as two plungers butt-jointed in the miter zone during the welding operation, and having a contour which substantially complements an inner contour of the seal and being so controlled as to be movable into the miter corner for covering the inner contour of the seal during the welding operation; and a movable guide mechanism acting on the plungers for moving the plungers between an idle position and an effective position in which the inner contour of the seals is covered during the welding operation, said guide mechanism including a guide piece shiftable in a slanted track arranged in a plane of the frame sections.

14. The apparatus of claim 13, and further comprising a spring compensation acting parallel to the frame sections.

15. The apparatus of claim 13 wherein each of the plunger has a spring-biased end distal to the miter corner and an end proximal to the miter corner and bearing upon the heated mirror during the welding operation.

16. The apparatus of claim 13, further comprising a cover element adjacent the plunger for covering an outer contour of the sealing lip, said cover element being provided with recesses for engagement by the sealing lip.

17. The apparatus of claim 13, wherein the leg of the plunger is configured in the form of an angle suited to the miter corner.

* * * * *